United States Patent
Murata et al.

(10) Patent No.: US 9,310,528 B2
(45) Date of Patent: Apr. 12, 2016

(54) OPTICAL ELEMENT, IMAGING APPARATUS INCLUDING THE SAME, AND METHOD FOR FABRICATING THE SAME

(71) Applicant: PANASONIC CORPORATION, Osaka (JP)

(72) Inventors: Jun Murata, Osaka (JP); Takamasa Tamura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 240 days.

(21) Appl. No.: 14/030,578

(22) Filed: Sep. 18, 2013

(65) Prior Publication Data

US 2014/0063610 A1 Mar. 6, 2014

Related U.S. Application Data

(63) Continuation of application No. PCT/JP2013/000621, filed on Feb. 5, 2013.

(30) Foreign Application Priority Data

Feb. 6, 2012 (JP) ................................. 2012-022674

(51) Int. Cl.
*G02B 27/00* (2006.01)
*G02B 1/118* (2015.01)
(Continued)

(52) U.S. Cl.
CPC ............ *G02B 1/118* (2013.01); *B29D 11/0074* (2013.01); *B29D 11/00326* (2013.01);
(Continued)

(58) Field of Classification Search
CPC .......... G02B 1/118; G02B 3/08; G02B 1/041; G02B 3/0031; G02B 1/11; G02B 5/0221; G02B 5/1809; G02B 27/0172; G02B 3/0056; G02B 27/0101; G02B 27/0955; B29D 11/00326; B29D 11/00336; B29D 11/00769; B29D 11/00413; B29D 11/0048; B29D 11/0049; B29D 11/00567; B29L 2011/0016; B29L 2011/00; Y10S 425/808; Y10S 425/246; B29C 45/2708
USPC ............ 359/601, 613; 264/2.5, 1.32; 425/808
See application file for complete search history.

(56) References Cited

U.S. PATENT DOCUMENTS

| 2006/0215280 A1 | 9/2006 | Hayashi et al. |
| 2006/0220268 A1* | 10/2006 | Chao et al. ...................... 264/2.5 |
| 2007/0144700 A1 | 6/2007 | Kobayashi et al. |
| 2009/0128912 A1* | 5/2009 | Okada et al. ................... 359/576 |

FOREIGN PATENT DOCUMENTS

| JP | 2004-318055 A | 11/2004 |
| JP | 2005-254660 A | 9/2005 |

(Continued)

OTHER PUBLICATIONS

International Search Report issued in PCT/JP2013/000621, dated Mar. 19, 2013, with English translation.

*Primary Examiner* — Scott J Sugarman
*Assistant Examiner* — Alberto Betancourt
(74) *Attorney, Agent, or Firm* — McDermott Will & Emery LLP

(57) ABSTRACT

A method for manufacturing a lens which includes raised portions arranged on a surface of the lens with a pitch smaller than or equal to a predetermined pitch, and is configured to reduce reflection of light having a wavelength longer than or equal to the predetermined pitch includes preparing a molding die in which recessed portions corresponding to the raised portions are formed, filling a molten resin material into a cavity of the molding die via a gate, and curing the resin material in the molding die. The molding die includes a peripheral region in a periphery of the gate, and an adjacent region adjacent to the peripheral region. First recessed portions in the peripheral region are deeper than second recessed portions in the adjacent region.

7 Claims, 10 Drawing Sheets

(51) Int. Cl.
*G02B 3/08* (2006.01)
*B29D 11/00* (2006.01)
*B29L 11/00* (2006.01)

(52) U.S. Cl.
CPC ............ *G02B3/08* (2013.01); *B29D 11/00009* (2013.01); *B29D 11/0048* (2013.01); *B29D 11/0049* (2013.01); *B29D 11/00336* (2013.01); *B29D 11/00346* (2013.01); *B29D 11/00413* (2013.01); *B29L 2011/0016* (2013.01)

(56) References Cited

FOREIGN PATENT DOCUMENTS

| | | |
|---|---|---|
| JP | 2006-053220 A | 2/2006 |
| JP | 2006-267624 A | 10/2006 |
| WO | 2005-092588 A1 | 10/2005 |

\* cited by examiner

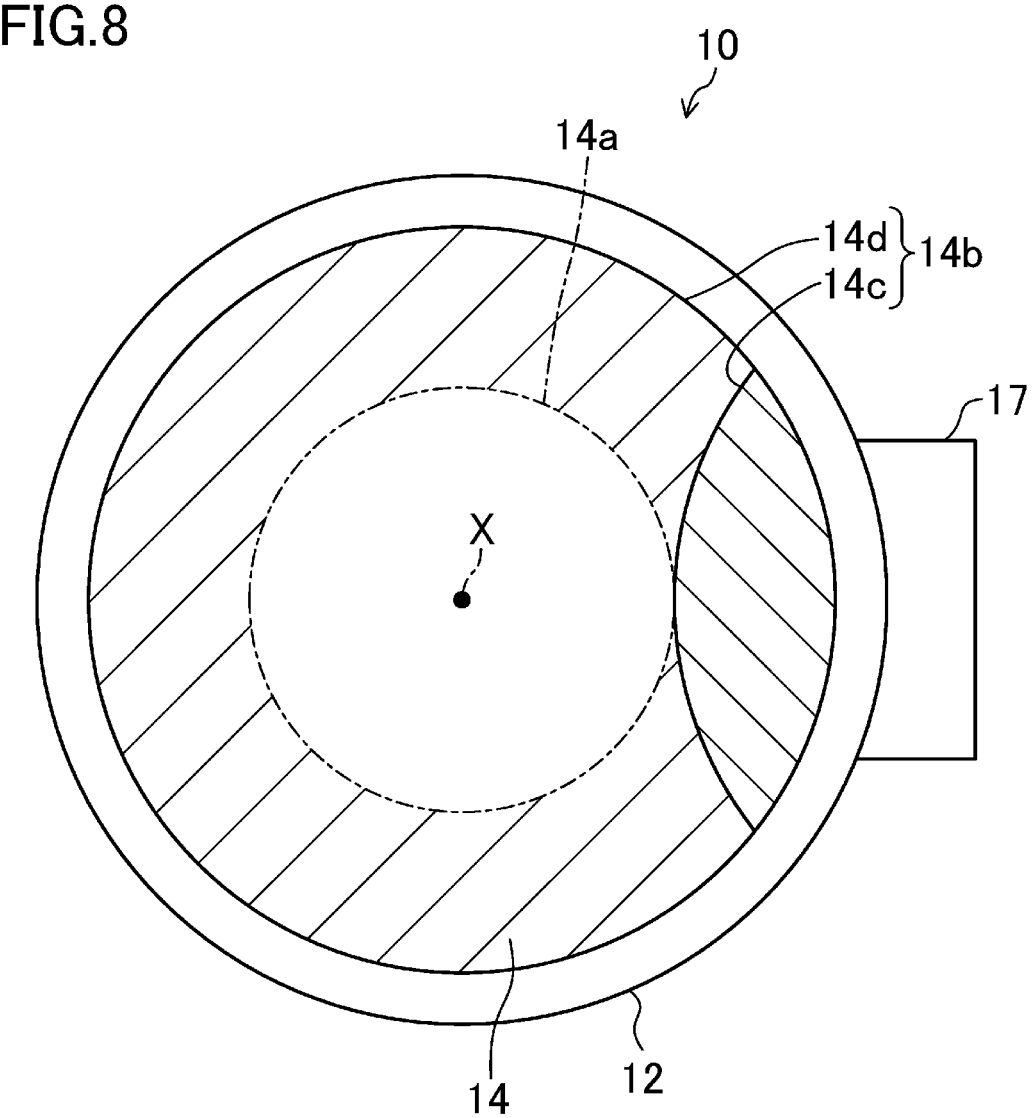

FIG.11A
 35b
 35
 35a
FIG.11B
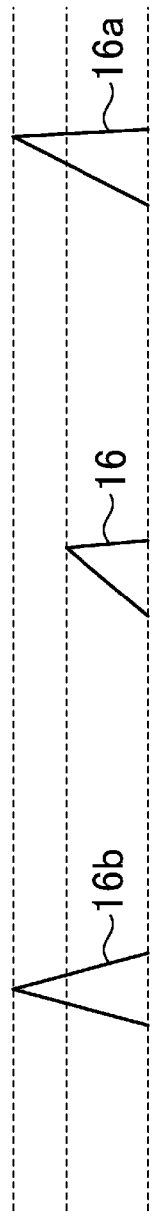
ADJACENT REGION | PERIPHERAL REGION, WHERE THE DEPTH OF THE RECESSED PORTION IS EQUAL TO THAT OF THE RECESSED PORTION IN THE ADJACENT REGION | PERIPHERAL REGION
16b | 16 | 16a

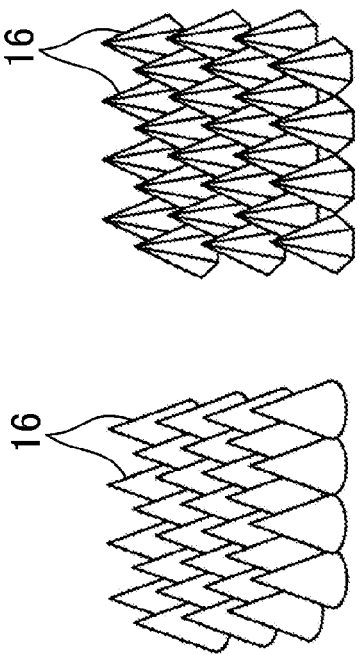
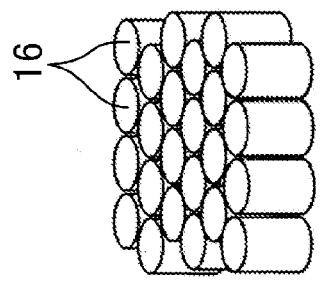
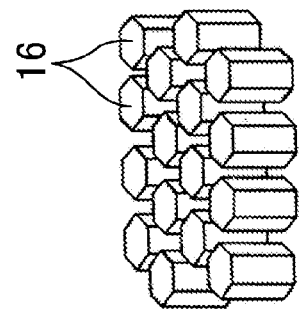
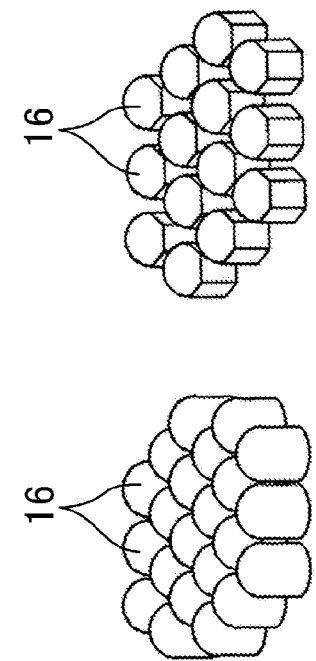
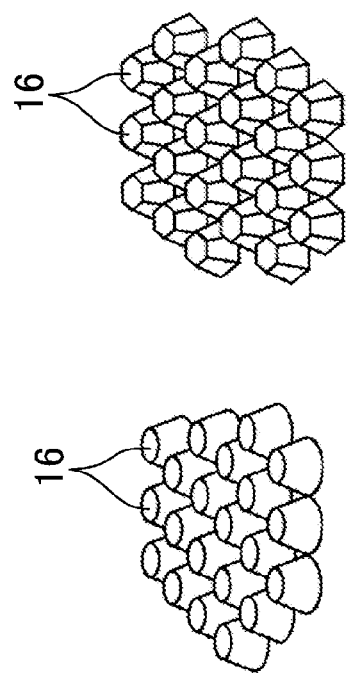
FIG.13A FIG.13B FIG.13C FIG.13D
FIG.13E FIG.13F FIG.13G FIG.13H

US 9,310,528 B2

OPTICAL ELEMENT, IMAGING APPARATUS INCLUDING THE SAME, AND METHOD FOR FABRICATING THE SAME

CROSS-REFERENCE TO RELATED APPLICATIONS

This is a continuation of International Application No. PCT/JP2013/000621 filed on Feb. 5, 2013, which claims priority to Japanese Patent Application No. 2012-022674 filed on Feb. 6, 2012. The entire disclosures of these applications are incorporated by reference herein.

BACKGROUND

A technique disclosed herein relates to optical elements including surfaces having antireflection structures configured to reduce reflection of incident light.

In recent years, various optical elements including surfaces having antireflection structures for reducing reflection of light have been proposed.

A technique has been proposed in which fine structural units (e.g., fine structures made of linear recessed portions or linear raised portions, or fine structures made of conical or columnar recessed portions or raised portions) as antireflection structures are formed on a surface of an optical member with a pitch smaller than or equal to the wavelength of incident light.

For example, an optical element disclosed in Japanese Patent Publication No. 2006-053220 includes an antireflection structure provided on a real or virtual curved surface. The antireflection structure includes fine structural units arranged with a pitch smaller than or equal to the wavelength of light whose reflection is to be prevented.

SUMMARY

The optical element may be produced by injection molding. In the injection molding, a molten molding material is injected via a gate into a cavity of a molding die, and the molding material is cured, thereby producing an optical element.

However, there may be a case where the form accuracy of an optical element produced in such a method is low near a gate section. In such a case, the antireflection properties of a gate peripheral region may be degraded.

A technique disclosed herein was devised in view of the foregoing, and it is an objective of the technique to improve the antireflection properties of a gate peripheral region.

A technique disclosed herein is directed to a method for manufacturing an optical element including raised portions arranged on a surface of the optical element with a pitch smaller than or equal to a predetermined pitch, and being configured to reduce reflection of light having a wavelength longer than or equal to the predetermined pitch. The method includes: preparing a molding die in which recessed portions corresponding to the raised portions are formed; filling a molten molding material into a cavity of the molding die via a gate; and curing the molding material in the molding die, wherein the molding die has a peripheral region in a periphery of the gate and an adjacent region adjacent to the peripheral region, and the recessed portions in the peripheral region are deeper than the recessed portions in the adjacent region.

A technique disclosed herein is directed to an optical element obtained by injection molding. The optical element includes: a plurality of raised portions arranged on a surface of the optical element with a pitch smaller than or equal to a predetermined pitch and configured to reduce reflection of light having a wavelength longer than or equal to the predetermined pitch, and a gate mark portion formed on an outer circumference of the optical element in the injection molding, wherein a circumferential portion of the surface has a first region whose position in the circumferential direction matches the gate mark portion, and a second region adjacent to the first region, and a shape of the raised portions in the first region is different from a shape of the raised portions in the second region.

A technique disclosed herein is directed to an imaging apparatus. The imaging apparatus includes the optical element.

With this method for manufacturing the optical element, it is possible to obtain an optical element having improved antireflection properties in a gate peripheral region.

With this optical element, it is possible to improve antireflection properties of a gate peripheral region.

With this imaging apparatus, it is possible to improve antireflection properties of a gate peripheral region.

BRIEF DESCRIPTION OF THE DRAWINGS

FIG. 8 is a plan view illustrating the optical element.

FIG. 11A is an enlarged sectional view illustrating various recessed portions, and FIG. 11B is an enlarged sectional view illustrating raised portions corresponding to the recessed portions of FIG. 11A.

FIGS. 13A-13H are perspective views illustrating raised portions of variations.

DETAILED DESCRIPTION

Embodiments are described in detail below with reference to the attached drawings. However, unnecessarily detailed description may be omitted. For example, detailed description of well known techniques or description of the substantially same elements may be omitted. Such omission is intended to prevent the following description from being unnecessarily redundant and to help those skilled in the art easily understand it.

Inventors provide the following description and the attached drawings to enable those skilled in the art to fully understand the present disclosure. Thus, the description and the drawings are not intended to limit the scope of the subject matter defined in the claims.

An example embodiment will be described in detail below with reference to the drawings.

[1. Optical Element]

Figure 1:
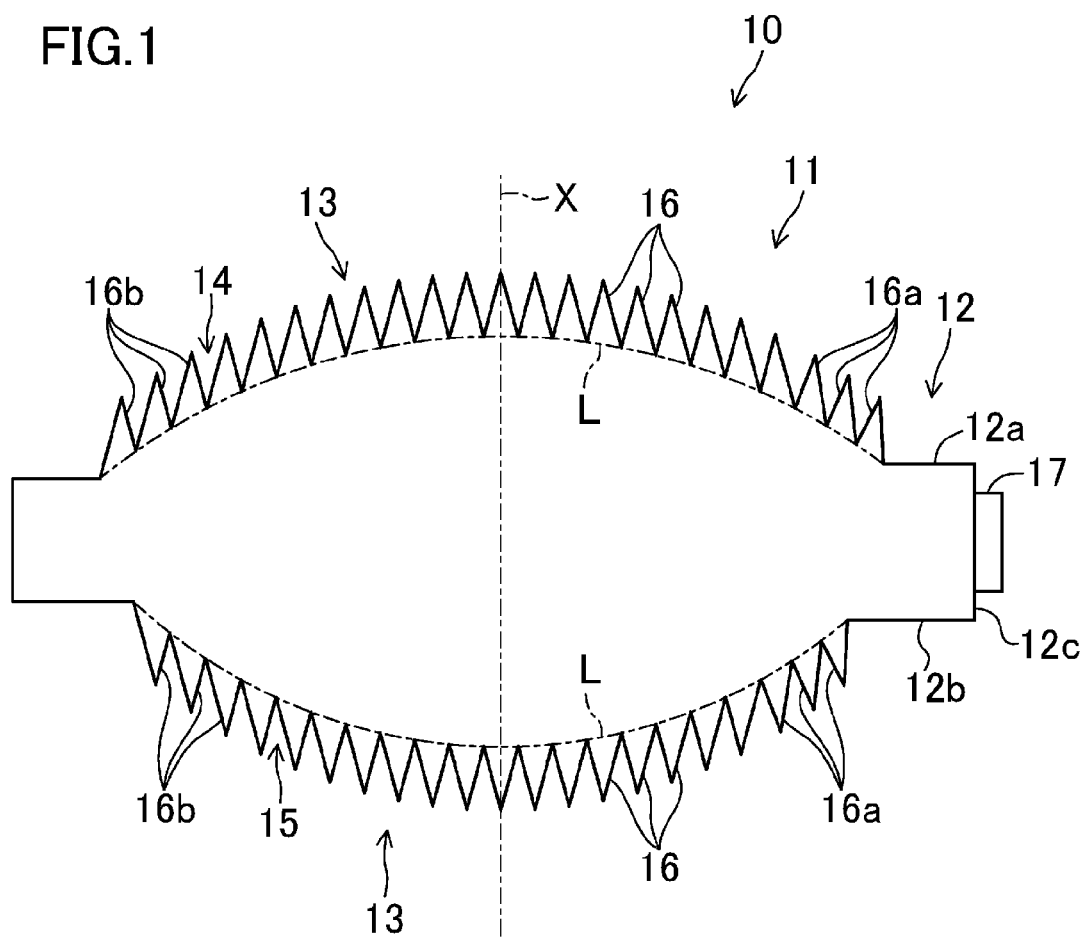
FIG. 1 is a sectional view illustrating an optical element.

FIG. 1 is a sectional view illustrating a lens 10. The lens 10 includes an optical portion 11 including an optical axis X and a cut end portion 12 provided at an outer periphery of the optical portion 11. The optical portion 11 and the cut end portion 12 constitute an element body. The lens 10 is a biconvex lens. The lens 10 is a resin molded product produced by injection molding. The lens 10 is an example of an optical element.

The optical portion 11 includes a first optical surface 14 and a second optical surface 15. The first and second optical surfaces 14 and 15 are optical functional surfaces (also referred to as optical effective surfaces).

The cut end portion 12 includes a first cut end surface 12a on the same side as the first optical surface 14, a second cut end surface 12b on the same side as the second optical surface 15, and an outer circumferential surface 12c. A plane including the first cut end surface 12a intersects the optical axis X, specifically, is orthogonal to the optical axis X. Likewise, a plane including the second cut end surface 12b intersects the optical axis X, specifically, is orthogonal to the optical axis X.

The first and second optical surfaces 14 and 15 each have a sub-wavelength structure (SWS) 13. The SWS 13 is an example of an antireflection structure. The SWS 13 includes a plurality of fine structural units arranged with a pitch smaller than or equal to a predetermined pitch (period), and can reduce reflection of light having a wavelength longer than or equal to the predetermined pitch. Structural units of the SWS 13 of the present embodiment are raised portions 16. The raised portions 16 each have a conical shape.

The plurality of raised portions 16 are arranged in the SWS 13, so that a plurality of recessed portions are each formed by being surrounded by the raised portions 16. A virtual surface formed by connecting bottoms (the lowest portions) of the recessed portions is referred to as a base surface L. The base surface L is formed to have a shape necessary for obtaining optical properties required for the lens 10. The base surface L is a curved surface. For example, the base surface L may be a spheric surface, an aspheric surface, or a free-form surface. Note that the base surface L may be a flat surface.

Figure 2:
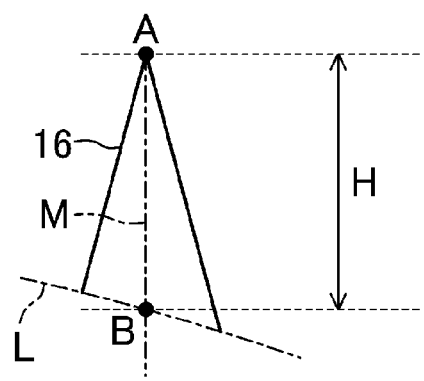
FIG. 2 is an enlarged sectional view illustrating a raised portion.

Here, the pitch of the raised portions 16 is a distance between vertices of adjacent ones of the raised portions 16 in a direction parallel to a plane orthogonal to the optical axis X. Moreover, the height of each raised portion 16 in the optical axis direction is a distance from the vertex of the raised portion 16 to the base surface L in the optical axis direction. FIG. 2 is an enlarged sectional view illustrating the raised portion 16. As illustrated in FIG. 2, the vertex of the raised portion 16 is denoted by A, a line segment extending from the vertex A in the optical axis direction is denoted by M, and an intersection of the line segment M and the base surface L is an intersection B. The height H of each raised portion 16 in the optical axis direction is defined by a distance from the vertex A to the intersection B. Note that the tip of the raised portion 16 actually formed may have a small curvature. In this case, the topmost portion of the raised portion 16 is the vertex A. The "height of the raised portion(s)," unless otherwise specified, hereinafter means the height in the optical axis direction.

The SWS 13 can reduce reflection of light having at least a wavelength longer than or equal to the pitch of the raised portions 16. When the lens 10 is used in an imaging optical system, light whose reflection is to be reduced is visible light. In this case, since a target wavelength is 400 nm-700 nm, the pitch of the raised portions 16 is preferably less than or equal to 400 nm.

Moreover, in order to obtain improved antireflection properties, the height of the raised portions 16 is preferably 0.4 or more times as large as the target wavelength. When the target wavelength is that of visible light, the height of the raised portions 16 is preferably greater than or equal to 280 nm.

Moreover, in order to prevent light from being diffracted at the SWS 13, the pitch of the raised portions 16 is preferably less than or equal to a solution obtained by dividing the target wavelength by the refractive index of the lens 10. When the target wavelength is that of visible light, and the refractive index of the lens 10 is 1.5, the pitch of the raised portions 16 is less than or equal to 266 nm.

Note that the optical functional surface of the lens 10 preferably has a relatively low reflectance and a relatively high transmittance. For example, when the pitch of the raised portions 16 is 230 nm, and the height of the raised portions 16 is 350 nm, the reflectance in the entire range of visible light can be lower than or equal to 0.1-0.2%, so that it is possible to obtain satisfactory antireflection properties.

A gate mark portion 17 is formed on the outer circumferential surface 12c of the cut end portion 12. When the lens 10 is produced by injection molding, resin in a gate is cured together with the lens 10, and when the lens 10 is released from dies, the resin in the gate is integral with the lens 10. After the lens 10 is released from the dies, the resin in the gate is cut off from the lens 10 by a cutter, or the like, but part of the resin remains. The remaining resin is the gate mark portion 17. Note that the shape of the gate mark portion 17 is not limited to a shape outwardly protruding from the outer circumferential surface 12c of the cut end portion 12. Alternatively, the resin in the gate integral with the lens 10 may be cut off together with the cut end portion 12. That is, part of the cut end portion 12 is cut along a plane. In this case, the part of the cut end portion 12 along which the planar cut is made is the gate mark portion 17. That is, the gate mark portion 17 may be a mark showing a position of the gate of the lens molded by injection molding, and thus can be any shape.

[2. Production Method]

Figure 3:
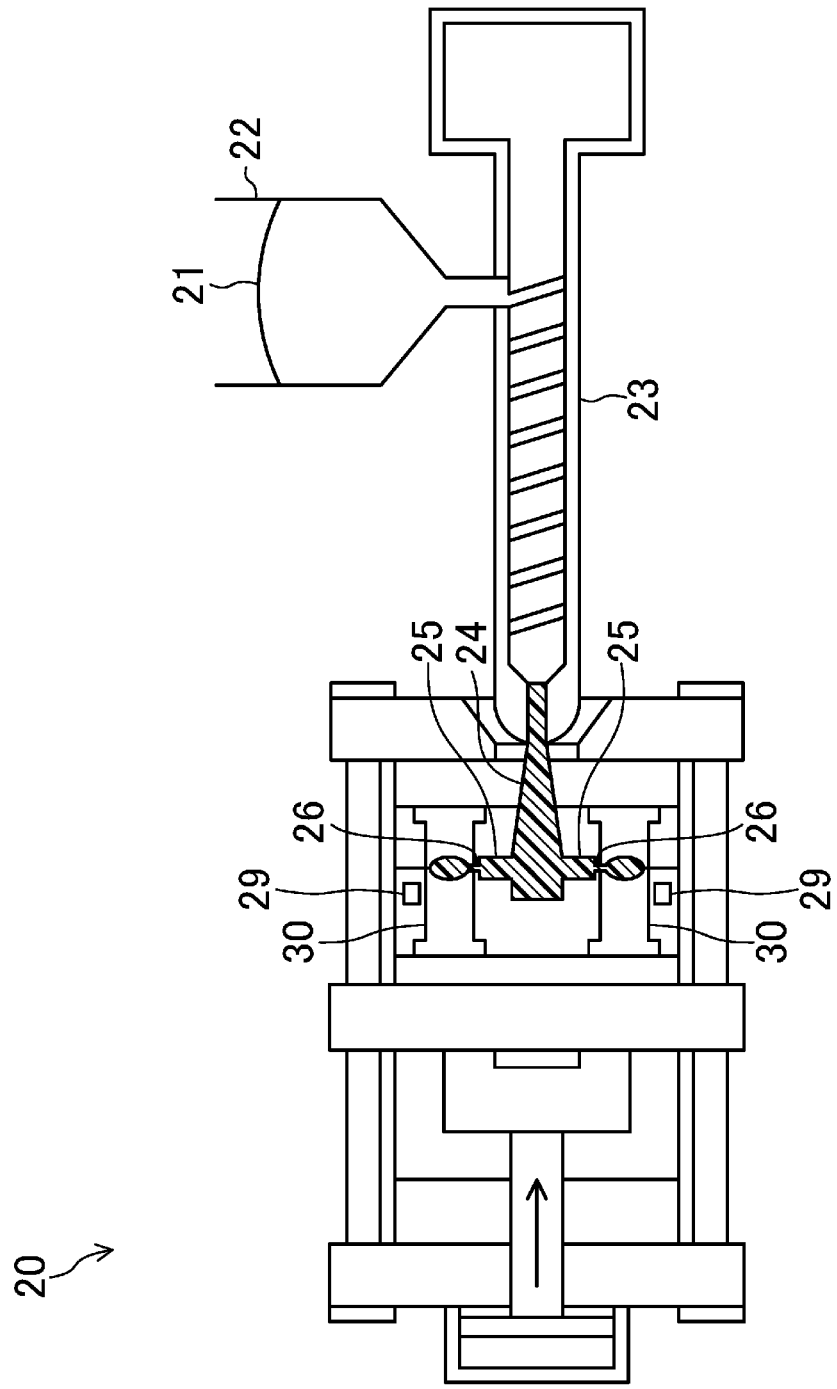
FIG. 3 is a view schematically illustrating an injection molding device.

Method for producing the lens 10 will be described below. FIG. 3 is a view schematically illustrating a configuration of an injection molding device 20 configured to mold the lens 10. The injection molding device 20 mainly includes a hopper 22, a screw 23, a sprue 24, a runner 25, a gate 26, a molding die 30, and a temperature regulator 29.

First, the molding die 30 is prepared, and is set in the injection molding device 20. A detailed configuration of the molding die 30 will be described later.

Subsequently, a resin material (pellet material) 21 is fed to the hopper 22. The fed resin material 21 is heated while measured by the screw 23. The heated resin material 21 is plasticized. The molten resin material 21 passes through the sprue 24, the runner 25, and the gate 26, and is injected into the molding die 30. The molten resin material 21 is injected into and fills a cavity of the molding die 30. The resin material 21 is an example of a molding material.

Then, the resin material 21 in the cavity is cooled by the temperature regulator 29 and is cured. Here, resin in the gate 26, the runner 25, and the sprue 24 is also cured. Subsequently, a first molding die 31 and a second molding die 32 are opened to release the lens 10 from the dies. When the lens 10 is released from the dies, the resin in the gate 26, the runner 25, and the sprue 24 are cured integrally with the lens 10. The resin in the gate 26, the runner 25, and the sprue 24 is cut off at the position of the gate 26 by a cutter, or the like. Thus, the gate mark portion 17 is formed on the lens 10.

Note that any material may be used as the resin material 21 as long as the material satisfies a refractive index and a variance required for the lens 10.

[3. Distortion]

The lens 10 obtained by injection molding shrinks during a curing process by cooling. Generally, the molding shrinkage ratio of a resin material for optical elements is 0.1-1.0%. The molding shrinkage ratio is a ratio of the dimension of a molded lens to the dimension of a molding die. The molding shrinkage ratio varies depending on types of resin, molding conditions, and shapes of molded products. Even in a single lens 10, the molding shrinkage ratio varies depending on portions of the lens 10. Specifically, the molding shrinkage ratio of the lens 10 varies between a portion located in a periphery of the gate mark portion 17 and the other portions. Thus, in the portion of the lens 10 located in the periphery of the gate mark portion 17, distortion which differs from distortion in the other portions is caused.

Specifically, in the case of injection molding, the filling rate of resin may be different depending on portions in the cavity. For example, the filling rate of resin is high in a portion in the cavity away from the gate 26. On the other hand, the density of resin filled in a portion located in a periphery of the gate 26 is lower than the density of resin in the other portions. The shrinkage amount of the portion in which the resin density is low is larger than the shrinkage amount of the portion in which the resin density is high. Thus, the shrinkage amount of resin filled in the portion in the periphery of the gate 26 at the time of cooling is larger than that of resin filled in the other portions. As a result, the distortion of the portion of the lens 10 in the periphery of the gate mark portion 17 is larger than that in the other portions.

Moreover, the shrinkage amount varies depending not only on the density of resin, but also on the difference of internal stress. When molten resin moves in the cavity, shear force is caused in the molten resin, and the shear force remains as internal stress in the molten resin. In the curing process of the molten resin by cooling, distortion is caused by the internal stress. When the internal stress is not uniform in the cavity, the distortion is not uniform, so that the shrinkage amount is not uniform.

The shear force caused in the molten resin will be described. When the molten resin is filled in the cavity, the molten resin has the following two flow patterns.

A first pattern is such that the molten resin entering the cavity reaches a portion in the cavity opposite to the gate 26, and is returned from the portion to flow toward a molding surface of the first molding die 31 and a molding surface of the second molding die 32. Since the temperature of the first molding die 31 and the second molding die 32 is generally lower than that of the molten resin, the molten resin which comes into contact with the molding surfaces of the first molding die 31 and the second molding die 32 is cooled by the respective molding dies. Here, a cured thin layer referred to as a skin layer is formed on a surface of the molten resin. However, in a portion on the inner side of the skin layer, the molten resin flows, and thus shear force is generated between the molten resin and the skin layer.

The second pattern is such that the molten resin is gradually filled via the gate 26 to a side opposite to the gate 26. The molten resin sequentially flows to the molding surface of the first molding die 31 and the molding surface of the second molding die 32 from the gate 26. Also in this pattern, the molten resin which comes into contact with the molding surfaces forms a skin layer. Even after a skin layer is formed in a periphery of the gate 26, an inflow of the molten resin via the gate 26 continues, so that in the periphery of the gate 26, a large shear force is generated between the skin layer and the molten resin.

In both the patterns, due to intense flow of the molten resin in the periphery of the gate 26, a larger shear force is generated in the periphery of the gate 26 than in the other portions. Moreover, as illustrated in FIG. 3, the diameter of the runner 25 is usually larger than the diameter of the gate 26. Therefore, the flow speed of the molten resin increases when the molten resin flows from the runner 25 to the gate 26. Thus, the flow speed of the molten resin at the gate 26 in the cavity is high. That is, the shear force is more likely to be generated in the periphery of the gate 26. Also from this point of view, in the molten resin in the periphery of the gate 26, a large shear force is generated compared to the other portions.

Thus, in the molten resin in the periphery of the gate 26, a large shear force is generated compared to the other portions, so that the shrinkage amount of the molten resin in the periphery of the gate 26 is large compared to the other portions.

Thus, in view of the fact that distortion of the portion of the lens 10 in a periphery of the gate mark portion 17 is large, the shape of a portion of the molding die 30 corresponding to the portion in the periphery of the gate mark portion 17 is formed to be different from that of the other portions.

[4. Molding Die]

Figure 4:
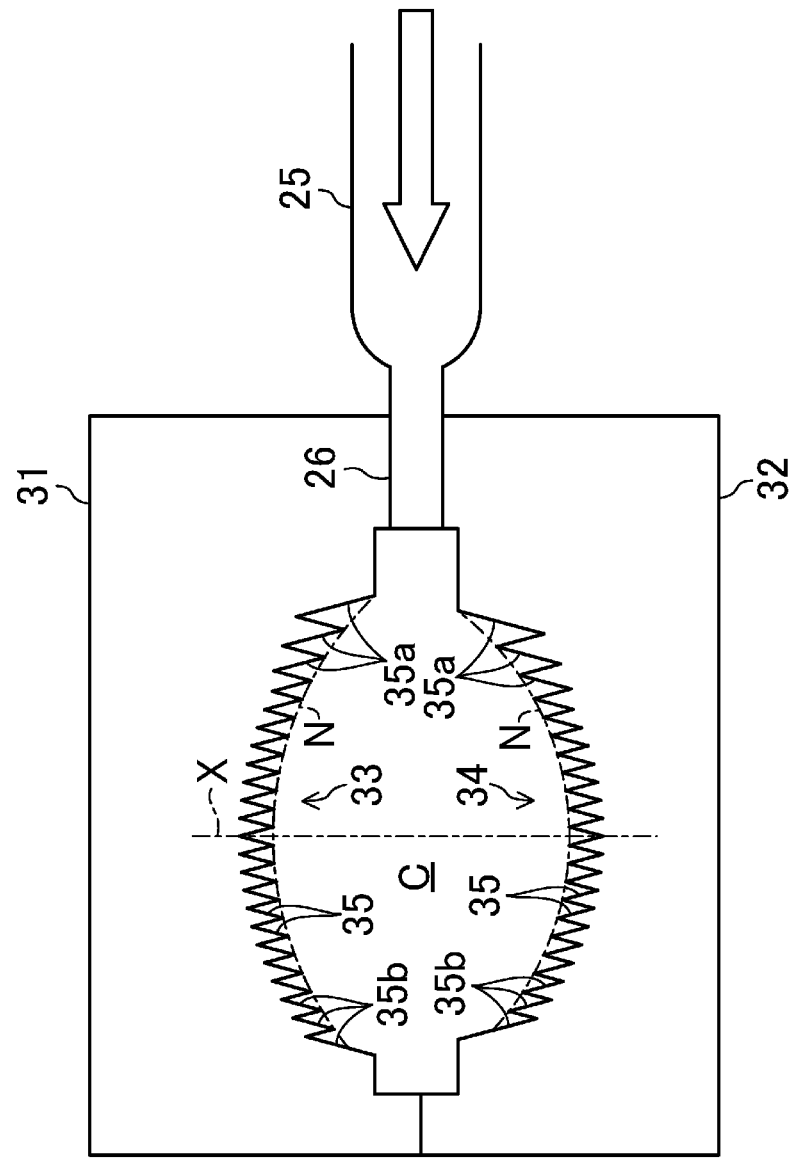
FIG. 4 is an enlarged sectional view illustrating a molding die.
Figure 5:
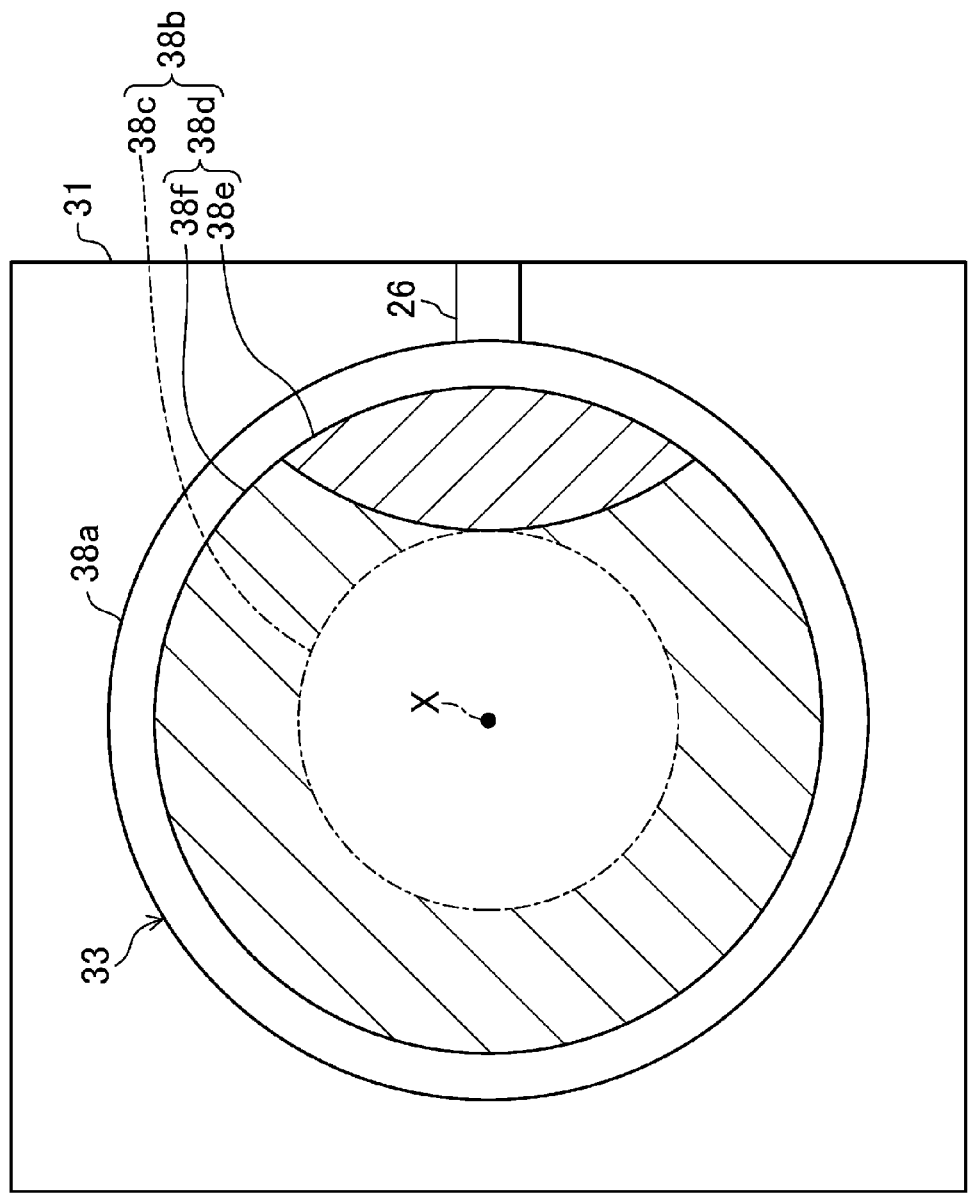
FIG. 5 is a view illustrating a molding surface of a first molding die.

FIG. 4 is an enlarged sectional view illustrating the molding die 30. In FIG. 5, a molding surface 33 of the first molding die 31 is shown. The molding die 30 includes the first molding die 31 and the second molding die 32. A cavity C is formed between the first molding die 31 and the second molding die 32. Fine structures for molding the SWSs 13 are formed on the molding surfaces of the first molding die 31 and the second molding die 32. Recessed portions 35 corresponding to the raised portions 16 are formed in a portion of the molding surface 33 of the first molding die 31 corresponding to the first optical surface 14 of the lens 10. In the same manner, recessed portions 35 corresponding to the raised portions 16 are formed in a portion of the molding surface 34 of the second molding die 32 corresponding to the second optical surface 15 of the lens 10. The recessed portions 35 have a substantially inverted shape of the raised portions 16.

Note that the gate 26 is formed at a portion corresponding to the outer circumferential surface 12c of the cut end portion 12 of the lens 10, and at a joint surface between the first molding die 31 and the second molding die 32.

The recessed portions 35 in the periphery of the gate 26 of the molding surface 33 and the molding surface 34 are formed to be deeper than the recessed portions 35 in the other portions.

Specifically, the molding surface 33 includes a cut end region 38a for molding the cut end portion 12, and an optical region 38b for molding the first optical surface 14. The recessed portions 35 are formed in the optical region 38b. The optical region 38b includes a center region 38c, and an annular circumferential region 38d outside the center region 38c. The circumferential region 38d includes a peripheral region 38e whose position in the circumferential direction around the optical axis X matches the gate 26, and an adjacent region 38f which is adjacent to the peripheral region 38e.

The shape of the recessed portions 35 in the peripheral region 38e is different from that of the recessed portions 35 in the adjacent region 38f. The recessed portions 35 in the peripheral region 38e are hereinafter referred to as first recessed portions 35a, and the recessed portions 35 in the adjacent region 38f are hereinafter referred to as second recessed portions 35b. Note that when a distinction is not made between the first recessed portions 35a and the second recessed portions 35b, the first recessed portions 35a and the second recessed portions 35b are simply referred to as recessed portion(s) 35.

Figure 6:
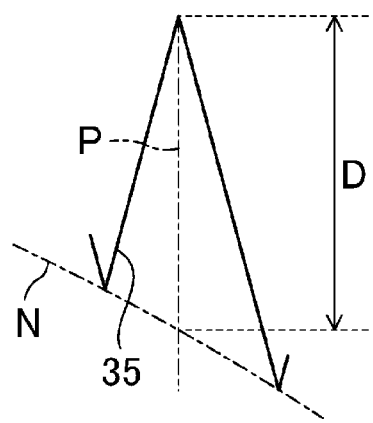
FIG. 6 is an enlarged sectional view illustrating a recessed portion.

FIG. 6 is an enlarged sectional view illustrating the recessed portion 35. The recessed portion 35 is a conical hole. An axis P of the recessed portion 35 extends parallel to the optical axis X. Here, the axis P of the recessed portion 35 is an axis of the cone, and in other words, a straight line serving as a bisector of the vertex angle of the cone in a sectional view of the recessed portion 35.

The depth D of the first recessed portion 35a in the peripheral region 38e in an optical axis direction is greater than the depth D of the second recessed portion 35b in the adjacent region 38f in the optical axis direction. Here, the depth D of the recessed portion 35 in the optical axis direction is a distance between a point at which a straight line extending from a bottom of the recessed portion 35 (a top portion of the cone) in the optical axis direction intersects a base surface N of the molding surface 33 and the bottom of the recessed portion 35. The base surface N of the molding surface 33 is a virtual surface formed by connecting top portions of raised portions each formed by being surrounded by the plurality of recessed portions 35, and is a surface corresponding to the base surface L of the lens 10. The "depth of the recessed portion(s)," unless otherwise specified, hereinafter means the depth of the recessed portion(s) 35 in the optical axis direction.

Note that since the axis P of the recessed portion 35 is parallel to the optical axis, the depth D of the recessed portion 35 corresponds to the depth of the recessed portion 35 in the axial direction. That is, the depth of the first recessed portions 35a in the peripheral region 38e in the axial direction is greater than the depth of the second recessed portions 35b in the adjacent region 38f in the axial direction.

The configuration of the recessed portions 35 in the center region 38c of the molding surface 33 is the same as the configuration of the second recessed portions 35b in the adjacent region 38f. However, the configuration of the recessed portions 35 in the center region 38c may be different from the configuration of the second recessed portions 35b of the adjacent region 38f.

The molding surface 34 of the second molding die 32 is formed in the same manner. That is, an annular circumferential region of the molding surface 34 corresponding to the circumferential portion of the second optical surface 15 includes a peripheral region whose position in the circumferential direction matches the gate 26, and an adjacent region adjacent to the peripheral region. The depth of the recessed portions 35 in the peripheral region is greater than the depth of the recessed portions 35 in the adjacent region.

Subsequently, a method for forming the first molding die 31 and the second molding die 32 having such configurations will be described.

FIGS. 7A-7F are views illustrating steps for forming the first molding die 31 for molding the lens 10. The first molding die 31 will be described here as an example, and the second molding die 32 can be formed in a similar manner.

Figure 7A:
FIGS. 7A-7F are views illustrating steps for forming the first molding die.

First, a molding die base material 41 is prepared. Then, as illustrated in FIG. 7A, an inverted shape of the lens 10 is formed in the molding die base material 41 by mechanical processing. The inverted shape of the lens 10 at this point means the inverted shape of the lens 10 with the raised portions 16 being omitted, and corresponds to the base surface L of the lens 10. The molding die base material 41 may be a material which has a high strength and in which a fine pattern can be easily formed by etching. For example, as the molding die base material 41, $SiO_2$ (quartz), Si (silicon), GC (glassy carbon), SiC (silicon carbide), WC (cemented), or the like may be used.

Figure 7B:
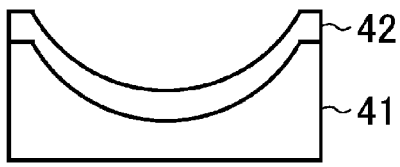

Next, as illustrated in FIG. 7B, a metal mask 42 is formed on a surface of the molding die base material 41. The metal mask 42 may be formed by sputtering or vapor deposition. As a material of the metal mask 42, Cr, Ta, WSi, Ni, W, or the like may be used.

Figure 7C:
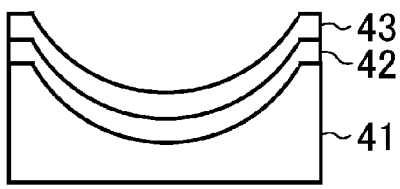

Subsequently, as illustrated in FIG. 7C, a resist mask 43 is formed on the metal mask 42. The resist mask 43 may be formed by spin coating, spray coating, or the like.

Figure 7D:
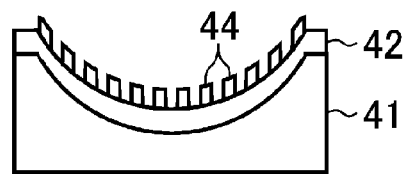

After that, as illustrated in FIG. 7D, a resist dot pattern 44 corresponding to the SWS 13 is formed from the resist mask 43. The resist dot pattern 44 may be formed by electron beam lithography, interference exposure (hologram exposure), or the like.

Figure 7E:
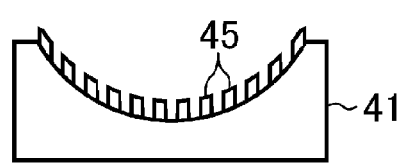

Next, as illustrated in FIG. 7E, the resist dot pattern 44 is transferred to the metal mask 42 by dry etching. Thus, a metal mask dot pattern 45 is formed. Alternatively, the metal mask dot pattern 45 may be formed by wet etching.

Figure 7F:
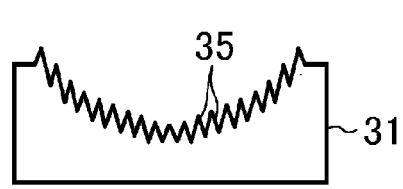

Subsequently, as illustrated in FIG. 7F, the metal mask dot pattern 45 is transferred to the molding die base material 41 by dry etching. Thus, recessed portions 35 having an inverted shape of the raised portions 16 are formed on the surface of the molding die base material 41. Here, the depth of the recessed portions 35 can be adjusted by the hole diameter of the resist dot pattern 44. For example, the depth of the recessed portions 35 can be increased by increasing the hole diameter of the resist dot pattern 44. That is, the hole diameter of the resist dot pattern 44 in the peripheral region 38e is larger than the hole diameter of the resist dot pattern 44 in the adjacent region 38f.

Thus, the first molding die 31 is formed.

[5. Detailed Configuration of Lens]

Subsequently, a detailed configuration of the lens 10 produced by using the molding die 30 will be described. FIG. 8 is a plan view illustrating the lens 10.

The first optical surface 14 includes a center portion 14a including the optical axis X, and a circumferential portion 14b outside the center portion 14a. The circumferential portion 14b includes a first region 14c whose position in the circumferential direction matches the gate mark portion 17, and a second region 14d adjacent to the first region 14c. The center portion 14a is molded by the center region 38c of the first molding die 31, and the circumferential portion 14b is molded by the circumferential region 38d of the first molding die 31. The first region 14c is molded by the peripheral region 38e of the first molding die 31, and the second region 14d is molded by the adjacent region 38f of the first molding die 31. For example, the first region 14c may be, but not limited to, a region in which a circle centering the middle of the gate mark portion 17 and having a radius of ¼ of the diameter of the lens 10 overlaps the first optical surface 14 in planar view. Alternatively, the first region 14c may be a region in which a circle centering the middle of the gate mark portion 17 and having a radius of ⅕ of the diameter of the lens 10 overlaps the first optical surface 14. The first region 14c is not limited to a shape defined by two arcs, but may have any shape. For example, the first region 14c may be a region defined in the circumferential portion 14b by two radii forming a predetermined angular width.

Figure 9:
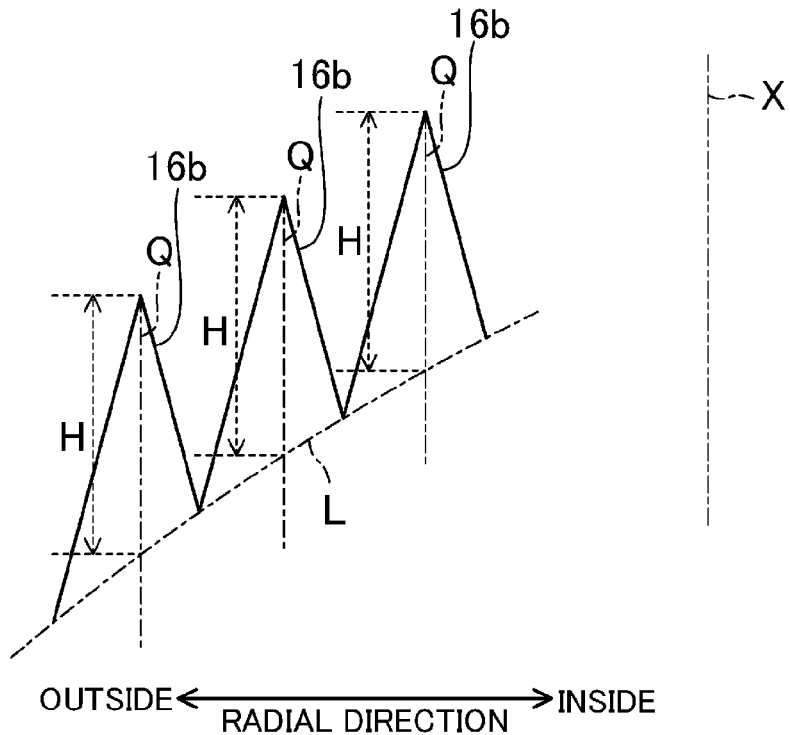
FIG. 9 is an enlarged sectional view illustrating second raised portions.

The shape of the raised portions 16 in the first region 14c is different from that of the raised portions 16 in the second region 14d. The raised portions 16 in the first region 14c are hereinafter referred to as first raised portions 16a, and the raised portions 16 in the second region 14d are referred to as second raised portions 16b. Note that when a distinction is not made between the first raised portions 16a and the second raised portions 16b, the first raised portions 16a and the second raised portions 16b are simply referred to as raised portion(s) 16. FIG. 9 is an enlarged sectional view illustrating the second raised portion 16b, and FIG. 10 is an enlarged sectional view illustrating the first raised portion 16a.

As illustrated in FIG. 9, an axis Q of each second raised portion 16b extends parallel to the optical axis X. Here, the axis Q is an axis of a cone, and in other words, a straight line serving as a bisector of the vertex angle of the cone in a sectional view of the raised portion 16. All the second raised portions 16b have substantially the same height H.

Figure 10:
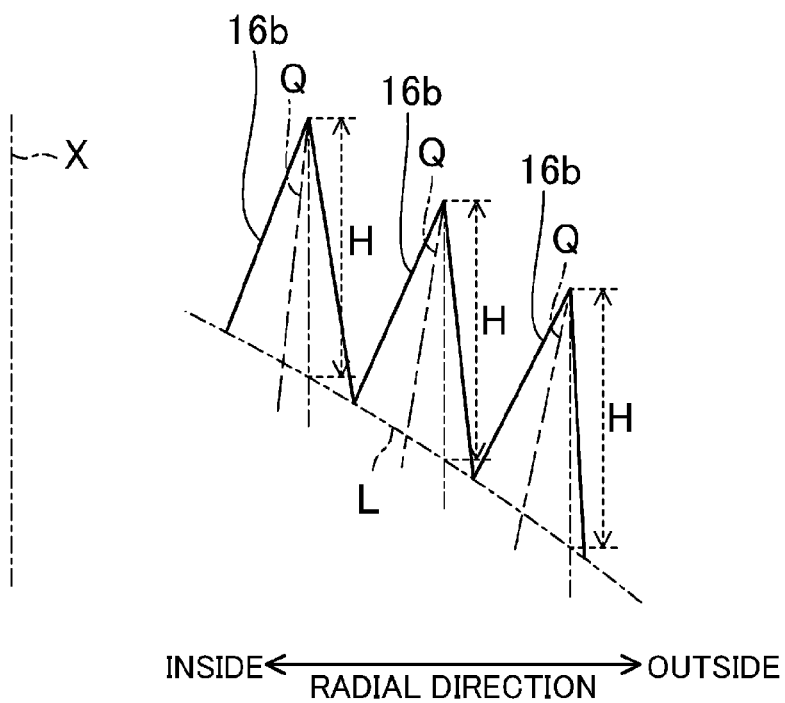
FIG. 10 is an enlarged sectional view illustrating first raised portions.

As illustrated in FIG. 10, an axis Q of each first raised portion 16a is tilted relative to the optical axis X. Specifically, the axis Q of the first raised portion 16a is tilted such that the tip of the first raised portion 16a is farther away from the optical axis X in a radially outward direction than the center point of the bottom circle of the first raised portion 16a is. Note that the height H of the first raised portions 16a is substantially equal to the height H of the second raised portions 16b. Unless otherwise specified, the "radial direction" hereinafter means a radial direction with respect to the optical axis X.

Thus, the first raised portions 16a are tilted, because as described above, a portion of the lens 10 located in the periphery of the gate mark portion 17 has a large shrinkage amount compared to the other portions during a curing process in injection molding. That is, the shrinkage amount of the first raised portions 16a in the radially outside portion is also larger than that of the first raised portions 16a in a radially inside section. As a result, the first raised portion 16a has such a shape that the axis Q is tilted radially outward.

Note that although the shrinkage amount in the first region 14c is larger than that in the second region 14d, the height H of the first raised portions 16a is substantially equal to the height H of the second raised portions 16b in the optical axis direction. This is because, as described above, the depth of the first recessed portions 35a by which the first raised portions 16a are molded is greater than that of the second recessed portions 35b by which the second raised portions 16b are molded. FIG. 11A is an enlarged sectional view illustrating various recessed portions 35, and FIG. 11B is an enlarged sectional view illustrating raised portions 16 corresponding to the recessed portions 35 of FIG. 11A. On the left in FIGS. 11A and 11B, the second recessed portion 35b in the adjacent region 38f and the second raised portion 16b in the second region 14d are shown. On the left in FIGS. 11A and 11B, the first recessed portion 35a in the peripheral region 38e and the first raised portion 16a in the first region 14c are shown. In the middle of the FIGS. 11A and 11B, the recessed portion 35 and the raised portion 16 are shown, where the depth of the recessed portion 35 in the peripheral region 38e is equal to that of the second recessed portion 35b. Note that in FIGS. 11A and 11B, the recessed portion 35 and the raised portion 16 are shown, where the base surfaces N, L are flat surfaces orthogonal to the optical axis X (i.e., horizontal surfaces). Moreover, in FIGS. 11A and 11B, the right side of the figures is the radially outside, and the left side of the figures is the radially inside.

As illustrated in FIG. 11, in the second region 14d (the adjacent region 38f), the second raised portion 16b shrinks during a curing process, and becomes smaller than the second recessed portion 35b, but the shape of the second recessed portion 35b is transferred with high precision. However, in the first region 14c (the peripheral region 38e), due to the above-described difference in shrinkage amount, the precision of transfer from the recessed portion 35 to the raised portion 16 is not satisfactory. Specifically, a portion of the raised portion 16 in the first region 14c closer to the gate 26 (i.e., a radially outside portion) shrinks radially inward relative to the optical axis X at a relatively high degree, which results in a shape tilted radially outward relative to the optical axis X. Additionally, the density of resin in the peripheral region 38e is lower than that in the adjacent region 38f, and the shrinkage ratio in the peripheral region 38e is higher than that in the adjacent region 38f. Thus, the raised portion 16 shrink at a higher degree in the peripheral region 38e than in the adjacent region 38f, and the height of the raised portion 16 in the axial direction in the peripheral region 38e is low. As a result, the height of the raised portion 16 in the optical axis direction is low.

In contrast, in the present embodiment, the first recessed portions 35a in the peripheral region 38e are deeper than the second recessed portions 35b in the adjacent region 38f. Thus, even when the first raised portions 16a in the first region 14c are tilted radially outward, or the height of the first raised portions 16a in the first region 14c in the axial direction is reduced compared to the second raised portions 16b in the second region 14d, the height of the first raised portions 16a in the optical axis direction is substantially equal to the height of the second raised portions 16b.

[6. Camera]

Figure 12:
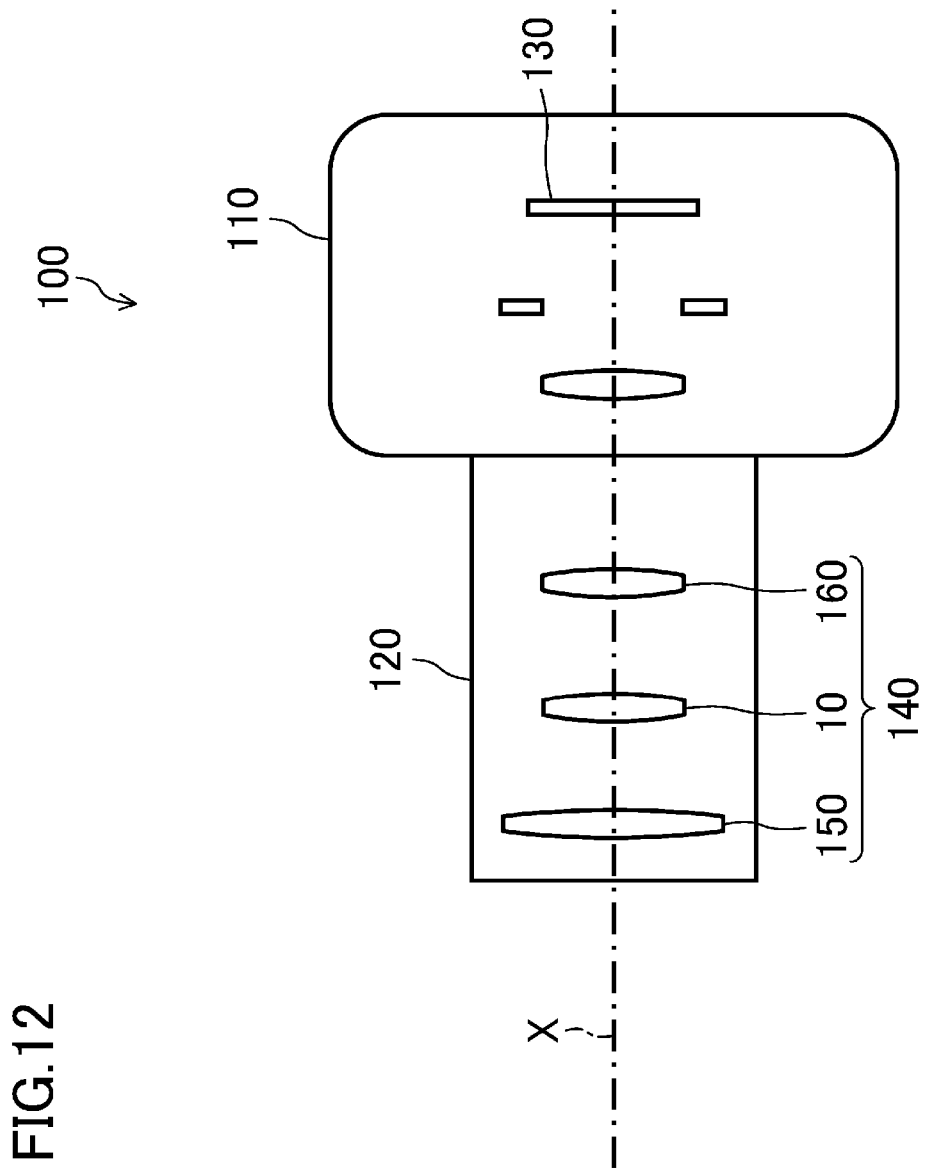
FIG. 12 is a view schematically illustrating a camera.

Next, a camera 100 including the lens 10 will be described. FIG. 12 is a schematic view illustrating the camera 100.

The camera 100 includes a camera body 110, and an interchangeable lens 120 attached to the camera body 110. The camera 100 is an example of an imaging apparatus.

The camera body 110 includes an imaging element 130.

The interchangeable lens 120 is configured to be detachable from the camera body 110. The interchangeable lens 120 is, for example, a telephoto zoom lens. The interchangeable lens 120 includes an imaging optical system 140 for focusing a light bundle on the imaging element 130 of the camera body 110. The imaging optical system 140 includes the lens 10 and refracting lenses 150 and 160. The lens 10 serves as a lens element.

[7. Advantages]

Therefore, the method for producing the lens 10 includes: preparing the molding die 30 in which the recessed portions 35 corresponding to the raised portions 16 are formed, injecting the molten resin material 21 into the cavity C of the molding die 30 via the gate 26; and curing the resin material 21 in the molding die 30, wherein the molding die 30 includes the peripheral region 38e in the periphery of the gate 26, and the adjacent region 38f adjacent to the peripheral region 38e. The first recessed portions 35a in the peripheral region 38e are deeper than the second recessed portions 35b in the adjacent region 38f.

With this configuration, the shrinkage amount of the resin material 21 is larger in the peripheral region 38e in the periphery of the gate 26 than in the adjacent region 38f. However, when the depth of the first recessed portions 35a are greater than that of the second recessed portions 35b, it is possible to ensure the height of the first raised portions 16a formed by the first recessed portions 35a. As a result, it is possible to improve antireflection properties of a region of the lens 10 which is in the periphery of the gate mark portion 17.

Moreover, the recessed portions 16 are formed in a portion of the molding die 30 corresponding to the surface of the lens 10, the gate 26 is formed in a portion of the molding die 30 corresponding to the outer circumference of the lens 10, the peripheral region 38e and the adjacent region 38f are formed in a portion of the molding die 30 corresponding to the circumferential portion 14b of the surface of the lens 10, and the peripheral region 38e is provided in a portion whose position in the circumferential direction matches the gate 26.

With this configuration, in the portion of the molding die 30 corresponding to the circumferential portion 14b of the surface of the lens 10, the regions in which the recessed portions 35 have different depths are provided. Specifically, the peripheral region 38e in which the recessed portions 35 have a relatively great depth and the adjacent region 38f in which the recessed portions 35 have a relatively shallow depth are provided. Moreover, the position of the peripheral region 38e in the circumferential direction matches the gate 26.

Moreover, the lens 10 includes the plurality of raised portions 16 arranged on the first optical surface 14 with a pitch smaller than or equal to a predetermined pitch and reducing reflection of light having a wavelength longer than or equal to the predetermined pitch, and the gate mark portion 17 formed on the outer circumference of the lens 10 in injection molding. The circumferential portion 14b of the first optical surface 14 includes the first region 14c whose position in the circumferential direction matches the gate mark portion 17, and the second region 14d adjacent to the first region 14c. The shape of the first raised portions 16a in the first region 14c is different from that of the second raised portions 16b in the second region 14d.

With this configuration, in the circumferential portion 14b of the first optical surface 14, the shape of the raised portions 16 (first raised portions 16a) located near the gate mark portion 17 is different from the shape of the raised portions 16 (second raised portions 16b) located away from the gate mark portion 17. That is, the shape of the raised portions 16 in the periphery of the gate mark portion 17 is different from the shape of the raised portions 16 in the other portions, so that the reflection properties of a region of the lens 10 located in the periphery of the gate mark portion 17 can be improved.

Moreover, the height H of the first raised portions 16a in the first region 14c in the optical axis direction is substantially equal to the height H of the second raised portions 16b in the second region 14d in the optical axis direction.

With this configuration, the height of the raised portions 16 (first raised portions 16a) near the gate mark portion 17 is substantially equal to the height of the raised portions 16 in the portion away from the gate mark portion 17. As a result, the antireflection properties of the region of the lens 10 located in the periphery of the gate mark portion 17 can be substantially comparable to those of the other regions.

Moreover, the first raised portions 16a in the first region 14c are more outwardly tilted than the second raised portions 16b in the second region 14d.

If the axis Q of each first raised portion 16a is parallel to the axis Q of each second raised portion 16b, the axis P of each first recessed portion 35a in the molding die 30 has to be tilted relative to the axis P of each second recessed portion 35b in anticipation that the first raised portions 16a are tilted radially outward after molding. However, it is time consuming to form a molding die in which the orientation of the axis P of each first recessed portion 35a is different from the orientation of the axis P of each second recessed portion 35b. In contrast, in the configuration in which the first raised portions 16a are more outwardly tilted than the second raised portions 16b, it is not necessary to tilt the axis P of each first recessed portion 35a relative to the axis P of each second recessed portion 35b in the molding die 30. That is, the molding die 30 can be easily formed.

Moreover, the camera 100 includes the lens 10.

With this configuration, the antireflection properties in the camera 100 can be improved.

EXAMPLES

Examples will be described below.

1. Examples

A lens 10 of a first example is a biconvex lens as illustrated in FIG. 1. The lens 10 had an outer diameter of 10 mm, and a center thickness of 3 mm A cut end portion 12 had a thickness of 1 mm. Moreover, the optical effective diameter was 6 mm. As a resin material, polyolefin-based resin APL5014 manufactured by Mitsui Chemicals, Inc. was used.

As a molding die base material 41, silicon carbide (SiC) was prepared. In the molding die base material 41, an inverted shape of a base surface L of the lens 10 was formed by mechanical processing. On the inverted shape, tungsten silicide (WSi) was provided by sputtering. Subsequently, On the tungsten silicide, an electron beam resist (positive) was applied by spray coating. Thereafter, on the electron beam resist, a dot pattern was formed by electron beam lithography.

Subsequently, the resist with the dot pattern formed thereon was used as a mask, thereby forming a dot pattern on the WSi mask by dry etching using an argon gas. Next, by dry etching using a fluorocarbon-based gas, an inverted shape of the SWS13 was formed on a surface of the molding die base material 41. Here, the depth of first recessed portions 35a in a peripheral region 38e was greater than the depth of second recessed portions 35b in an adjacent region 38f.

A thus formed molding die 30 was subjected to a release treatment by being immersed in a fluorine-based mold release agent. By using the molding die 30 subjected to the release treatment, the lens 10 was produced by injection molding of polyolefin-based resin.

Conditions for the molding were such that the resin temperature was 260° C., the molding die temperature was 135° C., and the tact was 90 seconds. Moreover, the injection molding was performed with an 8-cavity molding die being installed in an injection molding device. The pressure applied to the molding die 30 was 100 MPa.

After molding, the shape of a SWS 13 on a surface of the lens 10 was measured. First raised portions 16a in a first region 14c of the obtained lens 10 had a shape which is tilted radially outward, but the height H of the first raised portions 16a was substantially equal to the height of the second raised portions 16b in a second region 14d. The pitch of the raised portions 16 was 250 nm over the entire surface of the lens 10. The height H of the raised portions 16 was larger than or equal to 280 nm over the entire optical effective surface, and a desired shape was ensured.

The reflectance of the obtained lens 10 with respect to visible light was measured, and the results showed that the reflectance was lower than or equal to 0.3% over the entire optical effective surface, and satisfactory reflectance properties were obtained.

2. Comparative Example

Next, a molding die in which the depth of recessed portions 35 in a peripheral region 38e is substantially equal to the depth of recessed portions 35 in an adjacent region 38f was formed in the same manner as the above-described method. By using the molding die, a lens was molded using the injection molding device which is identical to the above-described injection molding device.

The reflectance properties of the obtained lens were measured, and as a result, a portion away from a gate mark portion had a satisfactory reflectance of 0.3%. However, the reflectance of a portion in the periphery of the gate mark portion was 1.2%, and the reflectance properties were degraded.

Other Embodiments

As described above, the embodiments have been described as example techniques disclosed in the present application. However, the techniques according to the present disclosure are not limited to these embodiments, but are also applicable to those where modifications, substitutions, additions, and omissions are made. In addition, elements described in the embodiments may be combined to provide a different embodiment. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential.

The above embodiment may have the following configurations.

The SWSs 13 are provided only on the first optical surface 14 and the second optical surface 15, but the surfaces on which the SWSs 13 are formed are not limited to this configuration. The SWS 13 may be formed on the cut end portion 12. Alternatively, it is not necessary for the SWSs 13 to be formed both on the first optical surface 14 and the second optical surface 15, but the SWS 13 may be formed on any one of the surfaces.

The lens 10 has, but not limited to, a biconvex shape. For example, the lens 10 may have a biconcave shape, a convex meniscus shape, or a concave meniscus shape. Alternatively, it is not necessary that the lens 10 serves as a lens element.

The structural unit of the SWS 13 has a conical shape (see FIG. 13A), but the shape of the structural units is not limited to this shape. Alternatively, as illustrated in FIG. 13B, the structural unit may be in the shape of a pyramid such as a hexagonal pyramid, a quadrangular pyramid, etc. The structural unit may be in the shape of a column as illustrated in FIG. 13C, or a prism as illustrated in FIG. 13D. Alternatively, the structural unit may be in the shape of a column or a prism whose top portion is rounded as illustrated in FIG. 13E or FIG. 13F. The structural unit may be in the shape of a truncated cone or a truncated pyramid as illustrated in FIG. 13G or FIG. 13H.

Moreover, the structural units may be raised portions formed by forming a plurality of recessed portions, the raised portions each formed by being surrounded by the recessed portions. That is, the raised portions have a relative relationship with respect to the recessed portions. In the SWS, the recessed portions are each formed among the plurality of raised portions, whereas the raised portions are each formed among the plurality of recessed portions. That is, it is possible to say that a plurality of raised portions are arranged in the SWS or that a plurality of recessed portions are arranged in the SWS. When the SWS is considered to be an arrangement of a plurality of raised portions, a technique disclosed herein is directed to specify a configuration of the raised portions or a configuration of recessed portions of a molding die which correspond to the raised portions.

Thus, it is not necessary that the structural unit has a geometrically exact shape. The structural units may have a raised shape allowing the structural units to be arranged with a pitch smaller than the wavelength of light whose reflection is to be reduced.

As described above, the technique disclosed herein is useful for optical elements having antireflection structures configured to reduce reflection of incident light. For example, by using the optical element disclosed herein, it is possible to obtain various optical systems such as high-quality imaging optical systems, objective optical systems, scanning optical systems, and pickup optical systems, various optical units such as barrel units, optical pickup units, and imaging units, imaging apparatuses, optical pickup devices, optical scanning devices, etc.

Various embodiments have been described above as example techniques of the present disclosure, in which the attached drawings and the detailed description are provided.

Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A method for manufacturing an optical element including raised portions arranged on a surface of the optical element with a pitch smaller than or equal to a predetermined pitch, and being configured to reduce reflection of light having a wavelength longer than or equal to the predetermined pitch, the method comprising:
preparing a molding die in which recessed portions corresponding to the raised portions are formed;
filling a molten molding material into a cavity of the molding die via a gate; and
curing the molding material in the molding die, wherein
the molding die has a first region and a second region, the first region is located between the gate and the second region, and
the recessed portions in the first region are deeper than the recessed portions in the second region.

2. The method of claim 1, wherein
the recessed portions are formed in a portion of the molding die corresponding to a surface of the optical element,
the gate is formed in a portion of the molding die corresponding to an outer circumference of the optical element,
the first region and the second region are formed in a portion of the molding die corresponding to a circumferential portion of the surface of the optical element, and
the first region is formed in a portion whose position in the circumferential direction matches the gate.

3. An optical element obtained by injection molding, comprising:
a plurality of raised portions arranged on a surface of the optical element with a pitch smaller than or equal to a predetermined pitch and configured to reduce reflection of light having a wavelength longer than or equal to the predetermined pitch, and
a gate mark portion formed on an outer circumference of the optical element in the injection molding, wherein
an optical axis of the optical element passes through the surface,
the surface has a first region and a second region, the first region is located between the gate and the second region,
at least a part of the first region and a part of the second region has the same distance from the optical axis, and
a shape of the raised portions in the part of the first region is different from a shape of the raised portions in the part of the second region.

4. The optical element of claim 3, wherein a height of the raised portions in the part of the first region in an optical axis direction is substantially equal to a height of the raised portions in the part of the second region in the optical axis direction.

5. The optical element of claim 3, wherein the raised portions in the part of the first region are more outwardly tilted than the raised portions in the part of the second region.

6. An imaging apparatus comprising:
the optical element of claim 3.

7. The method of claim 1, wherein
an optical axis of the optical element passes through the surface,
at least a part of the first region and a part of the second region have the same distance from the optical axis, and
the recessed portions in the part of the first region are deeper than the recessed portions in the part of the second region.

* * * * *